US012424685B2

United States Patent
Ikeyama et al.

(10) Patent No.: US 12,424,685 B2
(45) Date of Patent: Sep. 23, 2025

(54) LAMINATE-TYPE POWER STORAGE ELEMENT

(71) Applicant: FDK CORPORATION, Tokyo (JP)

(72) Inventors: Misako Ikeyama, Tokyo (JP); Rei Hanamura, Tokyo (JP); Ryuji Ito, Tokyo (JP); Hiroshi Yanagi, Tokyo (JP)

(73) Assignee: FDK CORPORATION, Tokyo (JP)

( * ) Notice: Subject to any disclaimer, the term of this patent is extended or adjusted under 35 U.S.C. 154(b) by 150 days.

(21) Appl. No.: 17/555,600

(22) Filed: Dec. 20, 2021

(65) Prior Publication Data

US 2022/0231358 A1 Jul. 21, 2022

(30) Foreign Application Priority Data

Jan. 20, 2021 (JP) ................................. 2021-007003

(51) Int. Cl.
*H01M 50/121* (2021.01)
*H01M 4/02* (2006.01)
*H01M 4/134* (2010.01)
*H01M 4/50* (2010.01)
*H01M 10/0525* (2010.01)
(Continued)

(52) U.S. Cl.
CPC ......... *H01M 50/121* (2021.01); *H01M 4/134* (2013.01); *H01M 4/502* (2013.01); *H01M 10/0525* (2013.01); *H01M 50/119* (2021.01); *H01M 50/124* (2021.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| 2005/0064282 A1 | 3/2005 | Inagaki et al. |
| 2005/0186472 A1 | 8/2005 | Kameyama et al. |

(Continued)

FOREIGN PATENT DOCUMENTS

| CN | 1245591 A | 2/2000 |
| CN | 1571211 A | 1/2005 |

(Continued)

OTHER PUBLICATIONS

Office Action and Search Report issued by the China National Intellectual Property Administration for corresponding Chinese Patent Application No. 202210035805.4, mailed on Dec. 27, 2023, with an English machine translation.

(Continued)

*Primary Examiner* — Matthew T Martin
*Assistant Examiner* — Krishna R Hammond
(74) *Attorney, Agent, or Firm* — Myers Wolin, LLC

(57) ABSTRACT

In a laminate-type power storage element, laminated films forming an exterior body are each formed by sandwiching a metal layer between a resin layer and a heat sealing layer. An electrode body includes a positive electrode and a negative electrode disposed opposite to each other across a separator and is enclosed together with a non-aqueous organic electrolyte solution inside the exterior body. Particles included in the positive electrode or negative electrode have a D90 particle size less than or equal to the thickness of the heat sealing layer.

5 Claims, 3 Drawing Sheets

(51) Int. Cl.
H01M 50/119 (2021.01)
H01M 50/124 (2021.01)

(56) References Cited

U.S. PATENT DOCUMENTS

| | | | |
|---|---|---|---|
| 2011/0250509 A1 | 10/2011 | Yamaguchi et al. | |
| 2013/0075673 A1* | 3/2013 | Nishijima | |
| 2013/0093398 A1 | 4/2013 | Takabayashi et al. | |
| 2016/0006075 A1* | 1/2016 | Tabuchi | H01M 10/0525 |
| | | | 429/317 |
| 2018/0019501 A1* | 1/2018 | Ito | |
| 2020/0411910 A1* | 12/2020 | Murashi | H01M 50/147 |
| 2021/0218066 A1* | 7/2021 | Matsuhashi | |
| 2021/0367230 A1 | 11/2021 | Ouki et al. | |

FOREIGN PATENT DOCUMENTS

| | | | | |
|---|---|---|---|---|
| CN | 101436679 | A | 5/2009 | |
| CN | 102077393 | A | 5/2011 | |
| CN | 103050647 | A | 4/2013 | |
| JP | 2005-158719 | A | 6/2005 | |
| JP | 2009266392 | A * | 11/2009 | |
| JP | 2012-209126 | A | 10/2012 | |
| JP | 2012-221855 | A | 11/2012 | |
| JP | 6132062 | B1 * | 5/2017 | ........ H01M 10/0525 |
| JP | 2017-130274 | A | 7/2017 | |
| JP | 2018-55952 | A | 4/2018 | |
| JP | 2018-139171 | A | 9/2018 | |
| JP | 2020-24877 | A | 2/2020 | |
| WO | 2011/002064 | A1 | 1/2011 | |
| WO | 2020/162277 | A1 | 8/2020 | |

OTHER PUBLICATIONS

Notice of Reasons for Refusal issued by the Japan Patent Office for corresponding Japanese Patent Application No. 2021-007003, dated Dec. 24, 2024, with an English translation.

* cited by examiner

LAMINATE-TYPE POWER STORAGE ELEMENT

CROSS-REFERENCE TO RELATED APPLICATION

This application is based upon and claims the benefit of priority of the prior Japanese Patent Application No. 2021-007003, filed on Jan. 20, 2021, the entire contents of which are incorporated herein by reference.

FIELD

The embodiment discussed herein relates to a laminate-type power storage element.

BACKGROUND

Extremely thin electronic devices (hereinafter, referred to as thin electronic devices) having built in power supplies have been put to practical use, such as IC cards with a one-time password function and a display, and tags and tokens (one-time password generators). To implement such thin electronic devices, downsizing and thinning of power storage elements (primary batteries, secondary batteries, electric double layer capacitors) serving as power supplies are indispensable.

There are laminate-type power storage elements that are suitable for the downsizing and thinning. A laminate-type power storage element has a configuration in which an electrode body is encapsulated in an exterior body formed of laminated films. The laminated films are each formed by sandwiching a metal layer between a resin layer and a heat sealing layer, and the heat sealing layer is placed inside the exterior body.
Japanese Laid-open Patent Publication No. 2020-24877
Japanese Laid-open Patent Publication No. 2009-266392
FDK Corporation, "Thin-type lithium manganese dioxide primary battery," online, searched on Dec. 10, 2020.

In a conventional laminate-type power storage element, particles such as active material particles removed from a positive or negative electrode included in an electrode body at the manufacturing stage may penetrate through the heat sealing layer of a laminated film, so that the metal layer of the laminated film may be exposed and the insulating property between the metal layer and the electrode body may thus be reduced. For example, such particles may come into contact with the metal layer, which may cause the metal layer and the positive or negative electrode to conduct each other via the particles. If this happens, an internal shortcut connecting the positive electrode and the negative electrode via the metal layer may be generated. In addition, in the case of a lithium-ion-based laminate-type power storage element, there may occur problems such as one where the potential of an exposed metal layer becomes a lithium potential and the metal layer is therefore corroded.

SUMMARY

According to one aspect, there is provided a laminate-type power storage element including: an exterior body formed of laminated films, the laminated films each being formed by sandwiching a metal layer between a resin layer and a heat sealing layer; and an electrode body including a positive electrode and a negative electrode disposed opposite to each other across a separator, the electrode body being enclosed together with a non-aqueous organic electrolyte solution inside the exterior body, wherein the positive electrode or the negative electrode includes particles having a 90% cumulative particle size less than or equal to a thickness of the heat sealing layer.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENT(S)

An embodiment will be described below with reference to the accompanying drawings.

Figure 1:
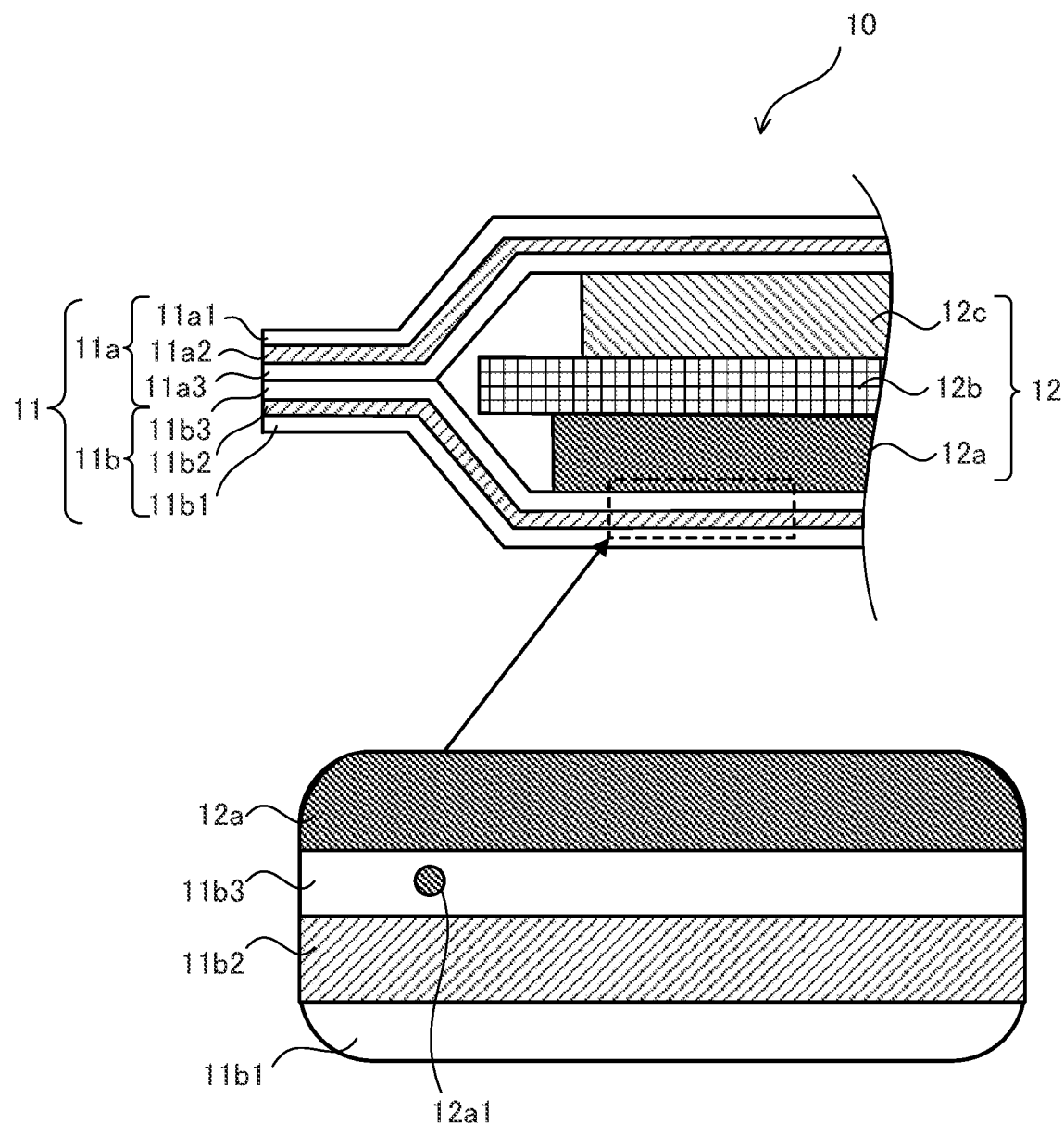
FIG. 1 is a sectional view illustrating an example of a laminate-type power storage element according to a present embodiment.
Figure 2:
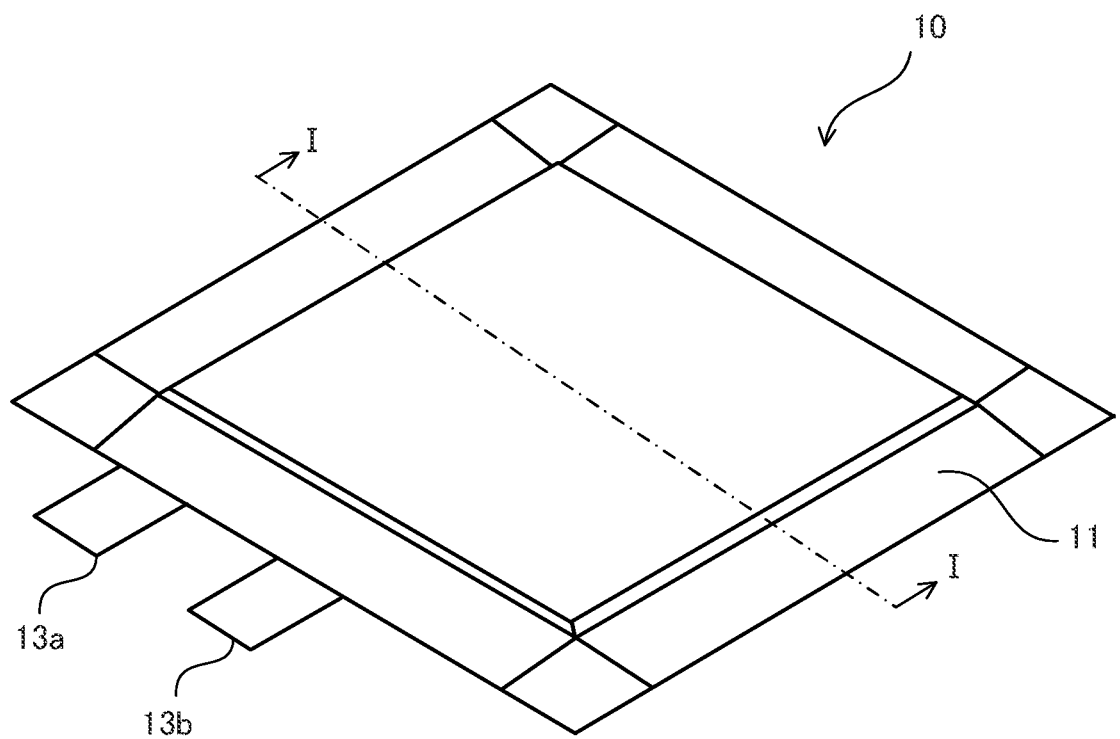
FIG. 2 is a perspective view illustrating the example of the laminate-type power storage element according to the present embodiment.

FIG. 1 is a sectional view illustrating an example of a laminate-type power storage element according to a present embodiment. FIG. 2 is a perspective view illustrating the example of the laminate-type power storage element according to the present embodiment.

In this connection, FIG. 1 illustrates part of a cross section taken along the line I-I of FIG. 2.

The laminate-type power storage element 10 of the present embodiment includes an exterior body 11 formed of laminated films 11a and 11b, and an electrode body 12 enclosed together with a non-aqueous organic electrolyte solution, not illustrated, inside the exterior body 11.

The laminated films 11a and 11b are made by thermal lamination processing, for example, by an extrusion lamination method. The laminated films 11a and 11b are formed by sandwiching metal layers 11a2 and 11b2 between resin layers 11a1 and 11b1 and heat sealing layers 11a3 and 11b3, respectively.

The metal layers 11a2 and 11b2 are base materials for the laminated films 11a and 11b. For example, the metal layers 11a2 and 11b2 are made of an aluminum foil, a stainless steel foil, or another.

The resin layers 11a1 and 11b1 form the outer surface of the laminate-type power storage element 10 and are made of, for example, polyethylene terephthalate (PET).

The heat sealing layers 11a3 and 11b3 are placed inside the laminate-type power storage element 10 (on the side where the electrode body 12 is placed) and are made of, for example, a resin having thermal solubility, such as modified polyolefin.

In the exterior body 11 formed of the above laminated films 11a and 11b, the heat sealing layers 11a3 and 11b3 are thermally bonded together at their outer periphery so that the exterior body 11 is formed in a bag shape to enclose the electrode body 12 and the non-aqueous organic electrolyte solution therein.

The electrode body 12 has a positive electrode 12a and a negative electrode 12c, which are disposed opposite to each other across a separator 12b.

The positive electrode 12a is formed by applying a positive electrode material including a positive electrode active material to one principal surface of a current collector such as a metal plate or metal foil made of stainless steel or the like, for example.

For the separator 12b, a cellulose product or the like is used, for example.

The negative electrode 12c is formed by applying a negative electrode material including a negative electrode active material to one principal surface of a current collector such as a metal plate or metal foil made of stainless steel or the like, for example.

The electrode body 12 may be thermally bonded to the laminated films 11a and 11b. In this case, the positive electrode 12a is thermally bonded to the laminated film 11b by the heat sealing layer 11b3, and the negative electrode 12c is thermally bonded to the laminated film 11a by the heat sealing layer 11a3.

With respect to the small and thin laminate-type power storage element 10, which is used as a power supply in a card, an allowable range of displacement of the electrode body 12 and so on at the assembly step is approximately ±200 µm. Since the electrode body 12 is thermally bonded to the laminated films 11a and 11b themselves using the heat sealing layers 11a3 and 11b3, the electrode body 12 is easily fixed, which minimizes its displacement. In addition, since the electrode body 12 is thermally bonded directly to the laminated films 11a and 11b without an insulating tape interposed therebetween, no space in the thickness direction of the laminate-type power storage element 10 is uselessly used, which achieves high energy density.

In the case where the laminate-type power storage element 10 is a primary lithium battery, the positive electrode 12a is formed by applying a slurry of a positive electrode material including a positive electrode active material such as manganese dioxide ($MnO_2$) to one principal surface of a current collector. In addition, the negative electrode 12c does not have a current collector but is metal lithium or a lithium alloy in a foil or flat plate form.

In this connection, a tab 13a serving as a terminal is connected to the positive electrode 12a and a tab 13b serving as a terminal is connected to the negative electrode 12c. The tabs 13a and 13b extends to the outside from one side of the laminated films 11a and 11b.

In the above-described electrode body 12 of the laminate-type power storage element 10 of the present embodiment, the 90% cumulative particle size (hereinafter, referred to as D90 particle size) of particles included in the positive electrode 12a or negative electrode 12c is less than or equal to the thickness of the heat sealing layers 11a3 and 11b3. The reason why not a maximum particle size but the D90 particle size is used is because the maximum particle size may vary.

The above-mentioned particles included in the positive electrode 12a or negative electrode 12c are the particles of the positive electrode active material or negative electrode active material, for example. Alternatively, the particles may be the particles of another material such as a conductive assistant agent included in the slurry. Note that in the case where the laminate-type power storage element 10 is a primary lithium battery, the particles of manganese dioxide that is a positive electrode active material have the maximum particle size among the particles included in the positive electrode material, and therefore the D90 particle size of the positive electrode active material may be set less than or equal to the thickness of the heat sealing layers 11a3 and 11b3. That is to say, a material with the maximum particle size among the materials included in the positive electrode 12a or negative electrode 12c may be set to have a D90 particle size less than or equal to the thickness of the heat sealing layers 11a3 and 11b3.

In this connection, the D90 particle size of particles included in the positive electrode 12a and negative electrode 12c may be set less than or equal to the thickness of the heat sealing layers 11a3 and 11b3. Alternatively, the D90 particle size of particles included in one of the positive electrode 12a and negative electrode 12c may be set less than or equal to the thickness of the heat sealing layers 11a3 and 11b3. In the case where the laminate-type power storage element 10 is a primary lithium battery, for example, the negative electrode 12c formed using metal lithium or a lithium alloy in a foil or flat plate form has a low possibility that particles are removed therefrom at the manufacturing stage. Therefore, there only needs to satisfy the above-mentioned relationship between the D90 particle size and the thickness of the heat sealing layers 11a3 and 11b3 with respect only to the positive electrode 12a.

The D90 particle size that satisfies the above-mentioned relationship is obtained by, for example, milling the particles of the positive electrode material or negative electrode material for a prescribed period of time with a mill such a jet mill. The measurement for the D90 particle size is carried out with a laser diffractometry technique, for example.

Figure 3:
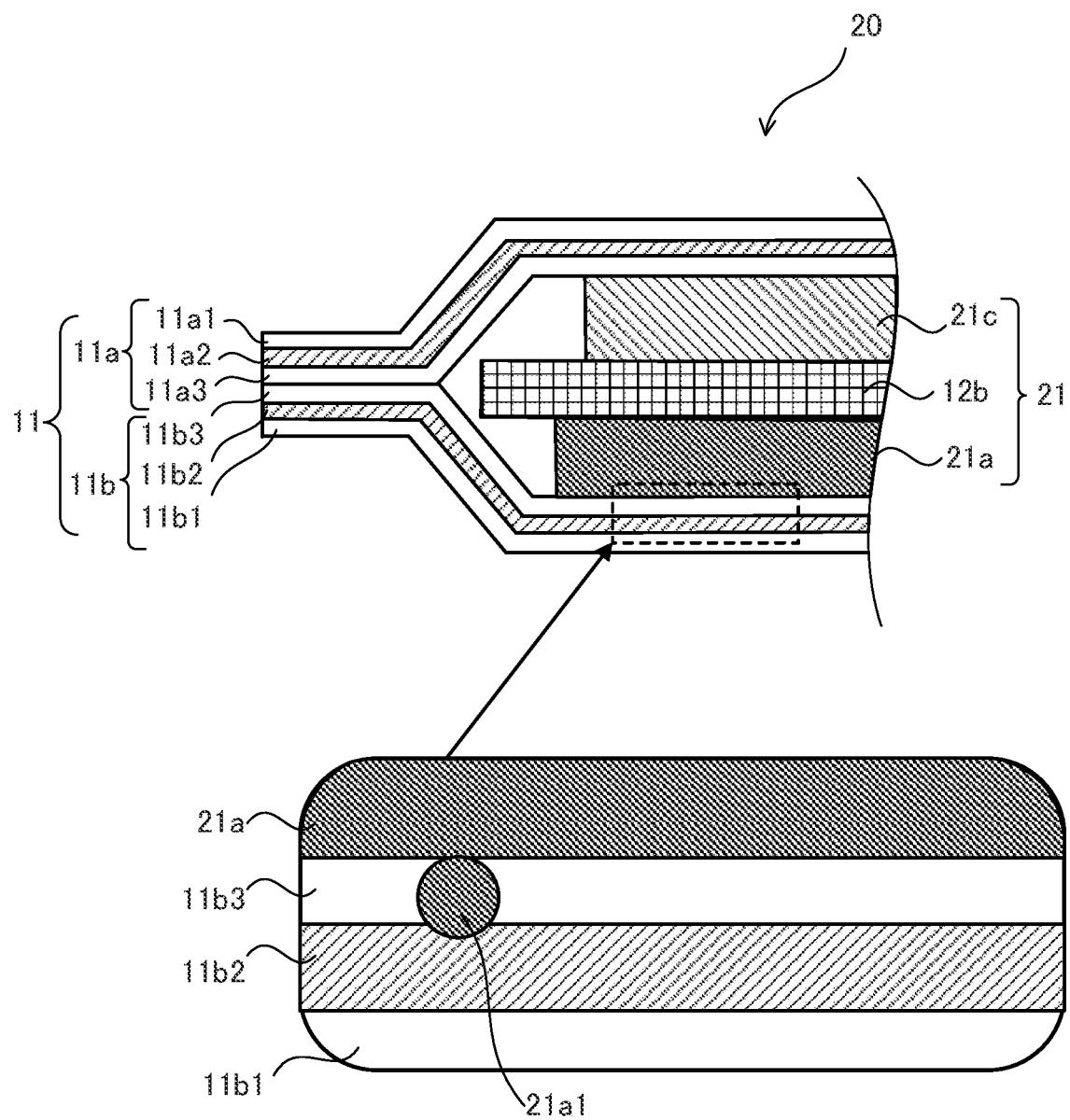
FIG. 3 is a sectional view of a laminate-type power storage element as a comparative example.

FIG. 3 is a sectional view of a laminate-type power storage element as a comparative example. The same reference numerals as used in FIG. 1 are used for corresponding components in FIG. 3.

In a positive electrode 21a and negative electrode 21c of an electrode body 21 in the laminate-type power storage element 20 as a comparative example, their particles are not controlled to have a D90 particle size satisfying the above-mentioned relationship, which is different from the positive electrode 12a or negative electrode 12c of the laminate-type power storage element 10 of the present embodiment. Therefore, for example, as illustrated in FIG. 3, a conductive particle 21a1 (for example, $MnO_2$) removed from the positive electrode 21a may penetrate through a heat sealing layer 11b3 of a laminated film 11b and may come into contact with a metal layer 11b2 of the laminated film 11b. In this case, the positive electrode 21a and the metal layer 11b2 conduct each other via the particle 21a1.

Recently, thin electronic devices demand higher energy density of power storage elements as well as higher energy density of main power supplies because of installation of displays. However, a simple increase in the dimension and thickness of the power storage elements is not acceptable because they are used in cards. A laminate-type power storage element may be configured to have higher energy density by using an electrode body with high energy density or increasing the size of the electrode body. A simple increase in the size of the electrode body, however, reduces the insulating property between the electrode body and a laminated film and thus reduces the quality. To enhance the insulating property, there is a way to protect the electrode body with an insulating tape. However, in the case where of a laminate-type power storage element with a thickness of 0.6 mm or less, the use of the insulating tape limits a space for disposing the electrode body, which does not allow the increase in the size of the electrode body and thus causes a difficulty in achieving high energy density. For this reason, it is desirable to thermally bond the electrode body directly to the laminated film without using the insulating tape. Please note however that the problem described with reference to FIG. 3 may occur.

By contrast, in the laminate-type power storage element 10 of the present embodiment, particles included in the positive electrode 12a or negative electrode 12c have a D90 particle size less than or equal to the thickness of the heat sealing layers 11a3 and 11b3. Therefore, even if a particle 12a1 is removed from the positive electrode 12a as depicted in FIG. 1, conduction does not occur between the positive electrode 12a and the metal layer 11b2 via the particle 12a1. Therefore, it is possible to avoid the reduction in the insulating property between the electrode body 12 and the metal layers 11a2 and 11b2 included in the laminated films 11a and 11b.

Since the above-described laminate-type power storage element 10 is able to avoid the reduction in the insulating property without using an insulating tape, it becomes possible to increase the size of the electrode body 12 and thus to achieve high energy density.

Note that the thickness of a thin battery such as the laminate-type power storage element 10 is predetermined. Therefore, thin laminated films 11a and 11b are used in the laminate-type power storage element 10 to secure a battery capacity. As thinner laminated films 11a and 11b are used, there is a higher possibility that the insulating property decreases. Therefore, the above-described setting, in which the D90 particle size of particles included in the positive electrode 12a or negative electrode 12c is less than or equal to the thickness of the heat sealing layers 11a3 and 11b3, has a high degree of effectiveness and is especially effective in the case where the laminated films 11a and 11b are 40 μm or less in thickness.

(Performance Evaluation)

Hereinafter, the results of performance evaluation will be described with respect to some examples with different manufacturing conditions.

Example 1

The positive electrode 12a is formed by applying an aqueous slurry of a positive electrode material to one principal surface of a stainless steel current collector. The positive electrode material has a composition containing 90.2 parts by weight of $MnO_2$ (D90 particle size of 24.4 μm), 5 parts by weight of acetylene black (AB), 3.7 parts by weight of styrene-butadiene rubber (SBR), and 0.8 part by weight of hydroxyethyl cellulose (HEC). Here, $MnO_2$ is a positive electrode active material, AB is a conductive assistant agent, SBR is a binder, and HEC is a thickening agent. The positive electrode material is applied at an application amount of 31 mg/cm². After the application, drying and pressing are performed. Then, a part is cut out in a size of 20×13 mm (excluding bonding portions for terminals), so that the positive electrode 12a is obtained.

The separator 12b is a cellulose product with a thickness of 20 μm.

The negative electrode 12c is obtained by cutting metal lithium or a lithium alloy in a size of 19×12 mm.

The electrode body 12 is a stack of the positive electrode 12a, separator 12b, and negative electrode 12c in this order.

This electrode body 12 is formed by laminating the positive electrode 12a thermally bonded to the heat sealing layer 11b3 of the laminated film 11b and the negative electrode 12c thermally bonded to the heat sealing layer 11a3 of the laminated film 11a with the separator 12b interposed therebetween.

In addition, the laminated films 11a and 11b respectively include the metal layers 11a2 and 11b2 made of aluminum and the heat sealing layers 11a3 and 11b3 made of modified polypropylene (PPa) with a thickness of 30 μm, which is an example of modified polyolefin.

The laminated films 11a and 11b with the electrode body 12 interposed therebetween are bonded together at three of their four sides, so that the bag-shaped exterior body 11 with the remaining one side open is obtained. Then, a non-aqueous organic electrolyte solution is injected from the opening of the exterior body 11, and the exterior body 11 is subjected to decompression impregnation and then is vacuum sealed (the remaining one side is sealed).

At this time, the sealing is performed with a sealing width of 2 mm and a heat bar of 180° C.

Example 2

The manufacturing conditions for a laminate-type power storage element 10 according to an example 2 are the same as those for the example 1, except that the D90 particle size of $MnO_2$ is set to 28.2 μm.

Example 3

The manufacturing conditions for a laminate-type power storage element 10 according to an example 3 are the same as those for the example 1, except that the D90 particle size of $MnO_2$ is set to 23.6 μm.

Comparative Example 1

Using the laminate-type power storage element 20 illustrated in FIG. 3 as an example, a comparative example 1 is that the D90 particle size of $MnO_2$ included in the positive electrode 21a is set to 43.5 μm. The other manufacturing conditions are the same as those for the example 1.

Comparative Example 2

Using the laminate-type power storage element 20 illustrated in FIG. 3 as an example, a comparative example 2 is that the D90 particle size of $MnO_2$ included in the positive electrode 21a is set to 56.5 μm. The other manufacturing conditions are the same as those for the example 1.

Example 4

The manufacturing conditions for a laminate-type power storage element 10 according to an example 4 are the same as those for the example 1, except that the heat sealing layers 11a3 and 11b3 of the laminated films 11a and 11b are made of PPa with a thickness of 40 μm.

Example 5

The manufacturing conditions for a laminate-type power storage element 10 according to an example 5 are the same as those for the example 1, except that the D90 particle size of $MnO_2$ is set to 56.5 μm and the heat sealing layers 11a3 and 11b3 of the laminated films 11a and 11b are made of PPa with a thickness of 80 μm.

(Performance Evaluation Results)

The following table 1 represents the results of an insulation test as the performance evaluation of the laminate-type power storage elements 10.

TABLE 1

|  | MnO$_2$ D50 PARTICLE SIZE (μm) | MnO$_2$ D90 PARTICLE SIZE A (μm) | THICKNESS B OF HEAT SEALING LAYERS (μm) | A/B | INSULATION DEFECTIVE RATE (%) | BATTERY CAPACITY (mAh) |
|---|---|---|---|---|---|---|
| EXAMPLE 1 | 14.4 | 24.4 | 30 | 0.81 | 0.00 | 15.8 |
| EXAMPLE 2 | 15.8 | 28.2 | 30 | 0.94 | 0.00 | 16.1 |
| EXAMPLE 3 | 14.3 | 23.6 | 30 | 0.79 | 0.00 | 15.5 |
| COMPARATIVE EXAMPLE 1 | 22.6 | 43.5 | 30 | 1.45 | 0.32 | 15.6 |
| COMPARATIVE EXAMPLE 2 | 25.7 | 56.5 | 30 | 1.88 | 0.86 | 15.9 |
| EXAMPLE 4 | 14.4 | 24.4 | 40 | 0.61 | 0.00 | 14.4 |
| EXAMPLE 5 | 25.7 | 56.5 | 80 | 0.71 | 0.00 | 7.6 |

The table 1 represents the D50 particle size and D90 particle size (A) of MnO$_2$, the thickness (B) of heat sealing layers 11a3 and 11b3, A/B, insulation defective rate, and measured battery capacity.

In this connection, the insulation test is carried out by applying a direct current voltage of 5.0 V between the tab 13a and the laminated film 11b of a manufactured laminate-type power storage element 10 (laminate-type power storage element 20 for the comparative examples 1 and 2) and measuring a resistance value. At this time, a resistance value less than 100 MΩ is taken to be undesirable, and some samples are tested to calculate an insulation defective rate.

As seen in the table 1, in the case where the D90 particle size of MnO$_2$ is less than or equal to the thickness of the heat sealing layers 11a3 and 11b3, that is, in the case where A/B is one or less, the insulation defective rates are 0.00%, which exhibits good insulating property. By contrast, in the case of the comparative examples 1 and 2 in which the D90 particle size of MnO$_2$ is greater than the thickness of the heat sealing layers 11a3 and 11b3, that is, in which A/B is greater than one, the insulation defective rates are 0.32% and 0.86%, which exhibits reduced insulating property.

In this connection, as seen in the table 1, as the heat sealing layers 11a3 and 11b3 become thicker, the battery capacity decreases. For example, with respect to the heat sealing layers 11a3 and 11b3, a thickness of 80 μm results in a battery capacity less than half the battery capacity obtained with a thickness of 30 μm. Therefore, the thickness of the heat sealing layers 11a3 and 11b3 is desirably 40 μm or less.

Heretofore, one aspect of the laminate-type power storage element according to the present embodiment has been described, and this is merely an example and is not limited to the above description.

According to one aspect, it is possible to avoid a reduction in the insulating property between an electrode body and a metal layer included in a laminated film.

All examples and conditional language provided herein are intended for the pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosure have been described in detail, it should be understood that various changes, substitutions, and alterations could be made hereto without departing from the spirit and scope of the disclosure.

What is claimed is:

1. A laminate-type power storage element comprising:
an exterior body formed of laminated films, the laminated films each being formed by sandwiching a metal layer between a resin layer and a heat sealing layer
an electrode body including a positive electrode and a negative electrode disposed opposite to each other across a separator, the electrode body being enclosed together with a non-aqueous organic electrolyte solution inside the exterior body, wherein a D90 value of a particle size distribution of first particles included in the positive electrode is between 0.61 and 1 times a thickness of the heal sealing layer, and the first particles are made of a material with the largest maximum particle size among materials included in the positive electrode;
a first terminal connecting to the positive electrode and extending to outside from one side of the laminated films; and
a second terminal connecting to the negative electrode and extending to outside from one side of the laminated films,
wherein among surfaces of the positive electrode and the first terminal, an entire surface of the positive electrode, which is opposite to a surface in contact with the separator, is thermally bonded to the heat-sealing layer of one of the laminated films, and
wherein the negative electrode is metal lithium or a lithium alloy in a foil or flat plate form.

2. The laminate-type power storage element according to claim 1, wherein the thickness of the heat sealing layer is 40 μm or less.

3. The laminate-type power storage element according to claim 1, wherein the heat sealing layer is made of modified polyolefin.

4. The laminate-type power storage element according to claim 1, wherein the first particles are particles of a positive electrode active material included in the positive electrode.

5. The laminate-type power storage element according to claim 1, wherein the first particles are particles of manganese dioxide that is a positive electrode active material included in the positive electrode.

* * * * *